United States Patent Office 3,565,833
Patented Feb. 23, 1971

3,565,833
CORE-DUAL SHELL GRAFT COPOLYMERS WITH ION EXCHANGE RESIN SHELLS
Hendrik Adriaan Jacobus Battaerd, North Clayton, Victoria, Australia, assignors to Imperial Chemical Industries of Australia and New Zealand Limited, Melbourne, Victoria, Australia, a corporation of Australia
No Drawing. Filed Dec. 27, 1968, Ser. No. 787,551
Claims priority, application Australia, Jan. 24, 1968, 32,553/68
Int. Cl. C08f *1/16, 15/00, 19/00*
U.S. Cl. 260—2.1      7 Claims

ABSTRACT OF THE DISCLOSURE

A graft copolymer wherein two reactive polymers are grafted on to and surround in shell form an inert polymeric nucleus. The shell, or shells, comprise separate and discrete regions of ion exchange reactive groups of opposite sign and the graft copolymers are suitable as ion exchange resins affording high reaction rates and high rates of equilibration.

---

This invention relates to new and useful polymeric plastic materials; more particularly it relates to graft copolymers, to processes of their manufacture and to their use, for example, in methods of ion exchange.

Ion exchangers are insoluble solid materials which carry exchangeable cations or anions. These ions may be exchanged for other ions of the same sign when the ion exchanger is in contact with, for example, an electrolyte solution. Ion exchangers may, for purposes of convenience in description, be divided into several types, for example strongly acidic cationic, weakly acidic cationic, strongly basic anionic, weakly basic anionic or those which contain functional groups which can form for example, chelates or complexes with ions. Ion exchangers consist of a framework carrying a positive or negative electric surplus charge which is compensated by mobile counter ions of opposite sign. Cation exchangers contain cations, and anion exchangers contain anions as counter ions which can be exchanged for other ions of the same sign. The exchange is stoichiometric and, as a rule, reversible, thus enabling exhausted ion exchangers to be regenerated. Usually the ion exchanger is selective, i.e. it takes up certain counter ions in preference to others. It may also sorb solvent and solutes and even precipitates may be removed from suspensions by treating the suspensions with an ion exchanger.

It is known from the book "Ion Exchange," F. Helfferich, McGraw-Hill Book Co. Inc., 1962, p. 317, that ion exchange is a diffusion process and its mechanism is a redistribution within the system of the counter ions by diffusion. The co-ion, by which term we mean the ionic species with the same charge sign as the exchanger framework, has relatively little effect on the kinetics and the rate of ion exchange. One of the rate determining steps in ion exchange is interdiffusion of the exchanging counter ions either within the ion exchanger itself (particle diffusion) or in a liquid layer which adheres to the surface of the exchanger—said liquid layer being known as a film—which is not affected by agitation of the solution (film diffusion). In conventional ion exchange media film diffusion is favoured by several factors, for example by high capacity, low degree of cross-linking, and small particle size of the ion exchanger; by low concentration and weak agitation of the solution; and by preference for the ion which is taken up from the solution.

In general, ion exchangers of the resinous type swell or shrink with absorption or description of a liquid and this characteristic is dependent, among other factors, on the type of liquid being treated, the ionic concentration of the solution or on the particular ionic state of the resin. The rate at which ion exchange resins can take up or liberate ions and the degree and rate of swelling or deswelling of the resin are finite for any particular resin when used for the treatment of a particular electrolyte.

Experience in the use of ion exchange resins has shown that the useful capacity of these resins to remove ions from an electrolyte is lower than their equilibrium capacity and hence their full theoretical capacity cannot be used in practice. It has often been recognized that such resins require to be regenerated when only about half, and sometimes less than half, of their available equilibrium capacity has been utilised. It has also been realised that, whilst capacities of known ion exchange resins have often been high, the time for them to reach equilibrium is uneconomically long for many applications.

In referring to the capacity of ion exchange media in this document we have used the definitions in the book "Ion Exchange," F. Helfferich, McGraw-Hill Book Co. Inc., 1962, Table 4–1, p. 73.

It is known from D. E. Weiss, Aust. J. Appl. Sci., 4 (4), 510 (1953) that ion exchange media may be made of two-layered components which are physically attached to each other and at least one of which is an inert inorganic material. These media suffer from the disadvantage that it is difficult to obtain adequate adhesion between the layers; consequently they are prone to breakage and the outer layer is separated too rapidly from the inner layer as a result of attrition in use. Weiss has also described the advantages which can accrue from the use of absorbent and ion exchange materials in which the reactive layer is localised in the outer shell of the particle, particularly for continuous countercurrent adsorption processes as in the so-called "Sirotherm" process where the rate of achieving equilibrium is more critical than mere capacity.

In our copending U.S. application Ser. No. 693,164 now U.S. Pat. 3,489,699, graft copolymeric particles are described in which an inert polymeric nucleus is surrounded by an outer graft copolymeric shell and this shell carries or is capable of incorporation of acidic or basic ion exchange reactive groups. When these graft copolymers are used as ion exchange resins, they combine resistance to attrition with high rates of reaction and equilibration. In Proc. Roy. Aust. Chem. Inst., vol. 32, No. 12, pp. 287–291, Weiss et al. have described ion exchange processes using a mixed bed of weakly acidic and weakly basic ion exchange groups in the so-called "Sirotherm" process for the demineralization of water; they have found however that ". . . the principal practical barrier in such a process is the inherently low reaction rate in a 'Sirotherm' mixed bed . . ." and that the ". . . biggest improvement in rates followed a reduction in particle size . . .." However, while particles of 5 to 10µ diameter appeared promising, they flocculated and low rates resulted again. As an alternative solution the authors then suggested an amphoteric resin, but noted that ". . . the effective capacity of such an amphoteric system is only one-seventh that of the comparable mixed bed; this could result from strong ion-pairing of carboxyl and amine groups in close proximity. A compromise between the mixed-bed and the amphoteric resin is therefore necessary, and the ultimate answer may be a 'micro mixed-bed' resin in which single beads contain separate regions of anionic and cationic activity in close proximity to one another. The size of these regions might ideally be of the order of 0.5µ. However, the synthesis of such resins will present a formidable challenge to polymer chemists" (citations from pp. 289 and 290 of the above-cited article).

We have now found new types of ion exchange material with improved characteristics which have solved this problem; thus they contain on a single bead separate regions of anionic and cationic activity of controllable size in sufficient proximity to each other to satisfy the particle size requirements for high reaction rate, without being subject to coagulation. At the same time they are by several orders larger than the regions of anionic and cationic activity resulting from randomly amphoteric ion exchange resins and thus do not set up impeding grids of ion-pairing acid/base groups. Consequently our controlled size amphoteric resins absorb and desorb at a faster rate and reach their equilibrium capacity rapidly while they retain resistance to attrition and coagulation. Our resins are particularly useful in processes of water demineralization based on thermal regeneration of an ion exchange system.

Accordingly we provide shaped shell graft copolymeric particles comprising firstly an inert polymeric nucleus having grafted on and covalently bonded to it at least one copolymeric shell comprising separate and discrete regions of ion exchange reactive groups of opposite sign. By opposite sign we mean that if the first copolymer carries a group which is or may be converted into a basic ion exchange group, then the second group carries a group which acts or may be converted into an acidic ion exchange group and vice versa. Alternatively, when our copolymers are used as chelating or complexing agents, we mean by "opposite signs" that each group has a different chelating or complexing activity. Another optional variant within the scope of this invention is to have a group of similar sign on each of the copolymers, e.g. a strongly basic group on one copolymer and a weakly basic group on the other copolymer or a strongly acidic group on one copolymer and a weakly acidic group on the other copolymer.

The spatial arrangement of the two regions of opposite signs in the outer copolymeric shell may be varied; thus e.g. the acidic and basic regions may each form a separate shell surrounding the polymeric nucleus or, alternatively, they may alternate in random fashion within one shell. In both arrangements the copolymeric grafted-on shells retain the advantages of the shell copolymeric particles of our U.S. Pat. 3,489,699. While, in addition, the advantages of amphoteric resins with controlled size of the reactive regions are attained.

Accordingly a preferred shaped dual shell graft-copolymer according to this invention comprises a polymeric nucleus which is non-reactive in ion exchange reactions and has grafted on to it and surrounding it in substantially even thickness a first, separate and discrete shell of grafted-on copolymer covalently bonded to said nucleus and carrying an ion exchange reactive group, and furthermore a second separate and discrete shell of copolymer carrying or capable of carrying ion exchange groups of sign opposite to that of the first shell, grafted-on, covalently bonded to and surrounding said first shell in substantially even thickness.

Optionally it is within our invention to surround the polymeric nucleus with more than two copolymeric shells (layers) of alternating sign and finite thickness or to interpose between two shells of opposite signs a "neutral" copolymeric layer, i.e. a layer carrying no ion exchange groups, but permeable to ions. The benefit envisaged for such a thin neutral layer is to separate the layers of opposite signs and thereby to reduce any barrier effect of ion pairing.

A second amphoteric shell graft copolymeric particle according to this invention comprises a heterogeneous polymeric nucleus free from ion-exchange groups but having surface areas of differing receptivity to grafting by irradiation with a high energy source and peroxidative grafting and, surrounding and grafted on to said nucleus, a copolymeric shell comprising one co-mer preferentially grafted on to the areas of the nucleus receptive to irradiation grafting and a second co-mer of opposite sign preferentially grafted on to the areas of the nucleus receptive to peroxidative grafting.

The heterogeneous nucleus consists of cohering but non-miscible polymers, e.g. an aromatic polymer, particularly polystyrene and its homologues, which is relatively inert to radiation grafting and a polyolefin or halogenated polyolefin, e.g. polyethylene or polytetrafluoroethylene, which responds to graft copolymerisation.

Preferably the shell portion of our copolymers comprises between 0.1 and 55% by weight, more preferably between 2 and 35% by weight and most preferably between 2 and 30% by weight of the copolymer particle, but these proportions are not narrowly critical. Best ion exchange reaction rates are obtained if the equivalent weight ratios of the cationic and anionic regions match the equivalence ratios of the aqueous media to be treated.

Optionally the nucleus may be cross-linked.

The polymeric nucleus may be a homopolymer or a copolymer. Although nuclei may be of irregular shape, regular geometrical shapes, for example cubes, polyhedrons and, particularly, spheres are preferred. Exact geometrical regularity is not critical. Spherical polymeric particles having a known average diameter and having a narrow particle size distribution may be prepared from the corresponding irregularly shaped polymeric particles as described in our co-pending U.S. application Ser. No. 689,323. A suitable diameter for spherical polymeric nuclei is in the range from 0.1 to 2 mm. and from 0.1 mm. to 0.5 mm. is preferred.

The first shell which surrounds the nucleus may be an essentially homogeneous or a copolymeric stratum grafted on to the nucleus; preferably it is of uniform thickness and completely encloses the inert nucleus. The thickness and mass of the shells is, of course, related to the amount of grafted co-mers and also depends on the molecular weight of the shell polymer, the size of the co-mers and the shape of the nucleus. In the case of a spherical particle we refer, for ease of description, to the radius of the inert nucleus as $r$ and the overall radius of the spherical particle as $R$, that is to say the thickness of the dual outer shells is $(R-r)$. Satisfactory copolymers may be obtained when $r/R$ is as high as 0.9996, i.e. the thickness of the shells is relatively small and it may be as low as 0.765, i.e. relatively thick shells are formed. We prefer that $r/R$ has values ranging from 0.993 to 0.89, which corresponds to about 2 to 30 parts by weight of copolymers in the shells per 100 parts of complete particle.

The polymeric substance used as inert nucleus in accordance with our invention preferably is insoluble in and substantially non-swellable by the co-mer from which the inner shell is formed. It should also be inert to the materials with which it may, at least to some extent, e.g. by diffusion through the shell, come into contact in subsequent use, for example, in chromatographic or ion exchange processes or in other applications hereinafter described. It should, of course, be capable of forming a graft with the co-mer forming the first inner shell. Preferably it should be amenable to processes whereby it may be shaped, most preferably into spheres, by known methods such as granular, pearl or dispersion polymerisation or by the processes described in Belgian Pat. No. 676,222 or our copending U.S. application Ser. No. 689,323. Within these general requirements the choice of the polymer is not critical; thus stable thermoplastic polymers are suitable and particularly convenient because of the greater ease of forming spheres from them, but thermosetting polymers are not excluded. Suitable polymers are, for example, polyolefins, polyvinyl compounds including aromatic polyvinyl compounds, polyvinylidenes, polysiloxanes, polydienes, polyethers, polyimides or polysulphones. Polyesters, polyamides, polyurethanes, polycarbonates, polyimines or polyureas are also suitable under mild conditions.

Suitable polyolefins are e.g. low and high density polyethylenes, polypropylene, polybutene, poly-4-methylpentene-1 and copolymers of alpha olefins with each other or with substituted vinyl and/or vinylidene monomers, e.g. vinyl esters, vinyl ethers or vinyl aromatic compounds. The polyolefins may also be totally substituted with halogens, e.g. polytetrafluoroethylene or poly(monochlorotrifluoroethylene).

Suitable vinyl and vinylidene polymers are, for example, polyvinyl chloride, polyvinyl fluoride, polyvinylidene chloride, polystyrene and substituted polystyrenes, polyacrylates, polymethacrylates, polyacrylamides and copolymers of the corresponding monomers. Particularly suitable for the formation of nuclei are polyethylene, polytetrafluoroethylene, polypropylene and polyisopropylstyrene.

Where it is desirable to use particles of a density greater than that of the polymer nucleus, the polymer may be compounded with a heavier inert filler and converted to suitable shapes. Suitable fillers, are for example, silica, siliceous earths, aluminous earths, zirconia, titania or barium sulphate in a finely divided form.

For the purposes of this invention it is desirable that the nucleus should have good physical strength. Although many polymeric materials lend themselves admirably to our purposes without modification, it may be desirable to increase the physical strength for certain applications or certain polymers by cross-linking.

A first class of monomers suitable for grafting on to the polymer nucleus and/or first shell comprises the group consisting of polymerisable alkenes and alkylidenes linked to a residue which is capable of accepting ion exchange reactive groups.

Suitable alkene and alkylidene groups are propenyl, allyl, vinylidene and, particularly vinyl. Suitable residues are e.g. carboxy-, carboxyl-, acyl halide, reactive halide, and nitrile groups. Thus monomers suitable for grafting and subsequent incorporation of ion exchange reactive groups are acrylic acid, methacrylic acid and their halides and nitriles, e.g. acrylonitrile, vinyl and allyl bromide, acroloin, crotonaldehyde, styrene and substituted styrenes.

Graft copolymers of this first type, comprising a nucleus entirely inactive in ion exchange reactions and a shell capable of accepting ion exchange reactive groups, are useful as an intermediate for the preparation of the ion exchange resin.

A second class of monomers useful for grafting on to the polymer nucleus and/or first shell comprises a polymerisable alkene or alkylidene group as above defined linked to a functional group, capable of forming reversible bonds, particularly an ion exchange reactive group. Another form of functional groups are chelate forming groups.

Suitable ionic acidic ion exchange reactive groups are those generally used in ion exchange reactions, e.g. sulphonic, phosphonic, phosphinic, thiophosphinic, arsonic and carboxy. Suitable acidic alkenic monomers are e.g. styrenesulphonic acid, divinylbenzenesulphonic acid, vinylsulphonic acid, acrylic acid and the alkacrylic acids, e.g. methacrylic acid; copolymerisable mixtures of these may also be used.

Suitable ionic basic ion exchange groups are also known from the art e.g. primary, secondary or tertiary amino groups, quaternary ammonium, phosphonium and tertiary sulphonium groups; suitable basic alkenic monomers are then e.g. N-dimethyl or N-diethylvinylamine, vinyl-N-phthalimide, N-vinyl- and other vinylpyrrolidines, 2- and 4-vinylpyridine, N-vinylpiperidine, N-vinylimidazole, the N-vinyl pyrrolidones, allylamine, propenylamine, allyl-mono- and di-alkylamines, e.g. allylethylamine, allyldiethylamine, dialkylaminoethyl acrylates and alkacrylates e.g. methacrylates, allyldiethanolamine, N-allylmorpholine, N-alkenyl piperidines, e.g. N-allylpiperidine, N-vinylmethylbenzylamine, allyltrialkylammonium chloride.

Metal-complex forming alkenic monomers suitable for chelating are also known, e.g. p-acetamidostyrene, which is graft copolymerised and from which the protecting acid group is then removed by hydrolysis to release the active amino group capable of forming Ni chelates, or derivatives of o-hydroxy carboxylic acids, e.g. salicyclic acid, o-hydroxy quinones, e.g. catechol or o-hydroxyethers, e.g. hydroxyacetophenone which may all be made by diazotisation of an aminostyrene graft copolymer and subsequent reaction with the o-hydroxy compound and all of which derivatives form heavy metal complexes.

Examples of suitable basic shell graft copolymers onto which acidic copolymer shells may be grafted are disclosed in U.S. Pat 3,489,699.

The chain length of the polymeric graft chains is not critical; it can be controlled in a manner known "per se" and both short and long graft chains are useful.

Methods of preparing graft copolymers are known from, for example, British Pat. No. 801,528. Our preferred method is to graft-polymerise in the presence of ionising of high energy radiation as understood in the art, preferably at irradiation rates between 100,000 and 300,000 rads per hour; this term includes (British Pat. No. 801,528, p. 1, lines 49–56) beta rays, gamma-rays, neutrons, accelerated electrons and heavy particles, X-rays, etc. or mixtures of them.

Convenient sources for such radiation may be furnished by atomic piles, electron or particle accelerators, radioactive isotopes and X-ray equipment. Graft polymerisation techniques are known "per se," e.g. from British Pat. No. 876,535 and methods of grafting acrylic or methacrylic acid to polyethylene substrates have been described by J. K. Rieke et al. in J. Polymer Sci., C.1, 117–133 (1963). In these disclosures the graft reaction was carried out with the polymeric backbone or trunk pre-irradiated, dissolved or swollen in a solvent, i.e. co-mer units penetrated deeply into or were evenly distributed throughout the substrate.

For the purposes of this invention, by contrast, it is preferred that the polymeric nucleus is made from a polymer which is inert and free from ion exchange reactive groups. Preferably the latter are located predominantly or entirely in the surrounding shells since otherwise reagent gets trapped in the interior of the ion exchange particle and greatly prolonged rates of diffusion of reagent into and from the reactive sites result. The rate of reaction and equilibration is largely determined by the longest diffusion path, since for many purposes and for clean reactions it is desirable that in each cycle a very high proportion of all available sites has been reacted; it is also desirable that the equilibrium capacity is clearly defined and reproducible.

The dual shell graft copolymers according to this invention may be made by preparing a single shell copolymer carrying an ion exchange reactive group as described in U.S. Pat. 3,489,699, preferably using irradiation dose rates in the range from 100,000 to 300,000 rads per hour converting the first shell so formed to its salt form and then grafting on to and around it in substantially even thickness a further copolymerisable co-mer carrying or capable of having incorporated in it ion exchange reactive groups of sign opposite to that of the first shell. Thus, e.g., typically, a copolymer consisting of a nucleus of polyethylene surrounded by a grafted-on shell of polyacrylic acid is converted to its alkali or alkaline earth salt form and onto it to a second shell of a basic monomer, for example N-vinylpiperidine, N-vinyl-methylbenzylamine or diallylamine, is grafted so as to form a dual shell to polymer having two separate, discrete shells each of substantially even thickness. A further typical example comprises grafting on to a nucleus of polyproylene a shell of polystyrene, converting this shell to its diethylmethylamino derivative, then forming its hydrochloride form and then grafting on to said first shell acrylic acid so as to form a dual shell copolymer.

Accordingly we provide a process of manufacturing dual shell copolymers which process comprises graft polymerising on to and around an inert polymeric nucleus a separate and discrete shell of substantially even thickness of a first copolymer carrying an ion exchange reactive group, converting said first copolymer to its salt form, reacting the resultant product with a further copolymerisable co-mer so as to graft on to and around the first shell a second copolymer carrying or capable of having incorporated in it ion exchange groups of a sign opposite to that of the first shell, thereby forming a second, separate and discrete outer shell of substantially even thickness.

The second type of amphoteric graft copolymeric particles of this invention, consisting of a heterogeneous polymeric nucleous free from ion exchange groups but surrounded by a single copolymeric shell with separate regions of opposite ion exchange reactive groups, is prepared by grafting suitable co-mers on to a heterogeneous polymeric nucleus. Such a nucleus may be prepared from two cohering but immiscible polymers, for example a polyolefin or a halogenated polyolefin and a polyvinyl aromatic compound such as polyisopropylstyrene, e.g. by compounding a mixture of these polymers, grinding the resultant blend and, optionally, converting the particles to a spherical form. The surface (and the bulk) of the nucleus is then composed of discrete areas of both components. The nucleus is reacted, under irradiation, with a high energy source with a first monomer carrying ion exchange reactive groups of one sign so that a graft is effected preferentially between the polyolefinic portion of the surface of the nucleus and the first polymerisable co-mer. A second graft is then effected by peroxidation of the residual polyvinyl aromatic region of the nucleus and grafting onto the regions so activated a second copolymer having ion exchange groups of the opposite sign. The sequence of grafting operations may, of course, also be reversed.

Accordingly we provide a process for the manufacture of shaped graft copolymers which process comprises firstly, preparing a polymeric nucleus substantially free from ion exchange groups and containing intimately mixed in separate phases two cohering but immiscible polymers having substantially differing receptivity to irradiation grafting, secondly, subjecting said nucleus to a grafting process with a first polymerisable co-mer so as to effect a preferential graft on to the surface of the nucleus occupied by one of the polymers forming the nucleus and thirdly, subjecting the resultant product to another type of grafting process with a second polymerisable co-mer of sign opposite to that of the first co-mer so as to effect a graft on the residual surface of the nucleus not already occupied.

The preferred differing grafting treatments are irradiation grafting and peroxidative grafting which latter includes a preliminary peroxidation step. Both techniques are well known. Suitable pairs AB and A,B, of cohering but immiscible polymers of differing receptivity to grafting may be made e.g. from (A) polytetrafluoroethylene and (B) polystyrene, polymethylstyrene, polyisopropylstyrene, and polyolefins such as polyethylene, polypropylene or poly-4-methylpentene-1; or (A,) polyolefins such as polyethylene, polyvinyl chloride, polyvinyl alcohol, polyvinyl acetate or polymethylmethacrylate and (B) polystyrene and derivatives such as polymethylstyrene or polyisopropyl styrene.

A technique of producing a suitable polymeric nucleus is described e.g. in our co-pending U.S. application Ser. No. 689,323; the technique of grafting an outer shell around it is disclosed in our U.S. Pat. 3,489,699. It may be carried out in liquid bulk of comonomer, in an inert solvent or in vapour phase.

Our copolymers are useful as resins in ion exchange processes. They have excellent adhesion of the copolymer shell to the nucleous and also of the outer shell to the inner shell; this is of great importance in technical use. It increases the length of their active life insofar as the particles are less prone to disintegrate, powder or become misshapen when used for example in a fluidised bed.

As already emphasized, the rate of ion exchange processes is diffusion controlled. This in turn is controlled by several factors including for example the nature and type of the ion exchange material, its shape and structure, its particle size, the degree to which it is cross-linked, and the temperature at which the ion exchange process is operated and, particularly, the length of the diffusion path to the reactive sites. In respect of the latter the longest paths are rate-controlling. It is therefore desirable to have as short a diffusion path within the ion exchange medium and as uniform path lengths as possible. The copolymers according to our invention which have an inert organic polymeric substrate surrounded by reactive noncrosslinked polymeric shells of even thickness have diffusion paths considerably smaller than the known polymeric ion exchange media.

Accordingly we also provide an improved ion exchange process comprising reacting an amphoteric ion exchange resin according to this invention with counter-ions.

To ensure that ion exchange media of the polymeric type are sufficiently insoluble in electrolytes and of sufficient physical strength to withstand physical breakdown or malformation, prior art polymers require a considerable degree of cross-linking. This is a disadvantage, since the rate of ion exchange is inversely related to the degree of cross-linking of the ion exchange medium. Copolymers according to our invention in which the reactive polymer is chemically bonded to the inert nucleus have shown improved, satisfactory resistance to attrition and physical breakdown without the need for cross-linking. Even when yet a further increase in strength by some cross-linking is desirable, the degree of cross-linking necessary is substantially lower than that required in similar or corresponding prior art ion exchange media. Consequently our copolymers exhibit improved rates of diffusion and ion exchange in contact with electrolytes, and improved rates of regeneration after they have become exhausted in use.

By a suitable combination of the inert nucleus and the reactive polymeric regions, ion exchange media or stripping agents may be prepared. Thus weakly acidic cationic ion exchange regions may be obtained from poly(acrylic acid) or poly(methacrylic acid). Weakly basic anionic ion exchange regions may be prepared for example from poly(diethylaminoethyl methacrylate),
poly(aminostyrene),
poly(ethylaminomethylstyrene),
poly(diethylaminomethylstyrene,
poly(aminopropylenestyrene,
poly(acrolein-co-allylamine),
poly(acrolein-co-allyldiethylamine),
poly(dimethylaminoethyl methacrylate) or
poly(isoaminobutene).

Similarly strongly acidic cationic ion exchange regions may be prepared from co-mers having acidic residues, e.g. sulphonic, phosphonic, phosphinic, thiophosphonic and arsonic acid residues. Strongly basic ion exchange regions may be prepared from quanternary ammonium, quanternary phosphonium or tertiary sulphonium groups.

As already stated, our copolymeric materials have the advantages of fast and efficient film diffusion, rapid and reproducible rate of equilibration, firm anchorage of the shells without cross-linking or with reduced cross-linking and symmetry of the particle and shells. Other advantages are that the particle size of the copolymer and the thickness of the shells may be controlled to give optimum flow rates of electrolytes for a given set of conditions and that damage to particles due to swelling and deswelling during ion exchange process cycles is minimized owing to the inert nature of the nucleus.

Our graft copolymers are particularly suitable for use as ion exchange media in continuous countercurrent adsorption ion exchange processes such as, for example, the so-called "Sirotherm" process. Our copolymers may also be used for the transformation of electrolytes in water softening; for the removal of ionic constituents from solutions by means of a combination of an anion exchange and cation exchange resin; for the fractionation of ionic substances, for example by gas-solid or liquid-solid chromatography or for the concentration of ionic substances. They also have applications in pharmacy, particularly in the separation or purification of amino acids, antibiotics, vitamins or hormones. Further uses are in the agricultural field for example the treatment of sugar-containing plants and purification of their products. They have utility in the recovery of organic acids such as citric, ascorbic or tartaric acids from food wastes. They are also effective as catalysts in chemical reactions and may be used to prepare colloids.

Besides being useful in their particulate form, our copolymers may also be shaped or fabricated into articles. They may, for example, be joined into networks of particles such as foams.

Our invention is now illustrated by, but not limited to, the following examples.

EXAMPLE 1

2 g. of spherical poly(ethylene-g-acrylic acid) particles containing 4.74% of grafted polyacrylic acid and in which the polyacrylic acid surrounded the polyethylene nucleus in the form of a shell of substantially even thickness was reacted with sufficient sodium hydroxide solution to convert the particles to their salt form. The dried product was then transferred to a glass reactor provided with a stopper and a tap and 5 ml. of N-vinylmethylbenzylamine was added. The reactor and its contents were then stoppered and freeze-degassed in two cycles using liquid nitrogen to a pressure of 0.01 mm. Hg. The reactor and its contents were then irradiated at room temperature using a cobalt-60 source delivering a dose at the rate of $1.7 \times 10^5$ rads per hour until a nominal dose of 10 megarads was delivered. After irradiation the irradiated product was washed with methanol, then with benzene, then again with methanol, dried under vacuum for 24 hours at 65° C and weighed. The weight of the final product was 2.03 g. and the increase in weight was attributed to poly-(N-vinylmethylbenzylamine) the presence of which in the graft copolymer was confirmed by infra-red spectroscopy. Using a staining technique, microscopic examination of the particles disclosed the presence of two separate discrete shells surrounding the nucleus one of which could be stained by a technique suitable for anion exchange reactive groups and the other one could be stained by a technique suitable for cation exchange reactive groups. There was thus obtained a graft copolymer suitable for use as an ion exchange resin which contained both anionic and cationic ion exchange groups on the one particle.

EXAMPLE 2

100 g. of spherical poly(propylene - g - diethylaminomethyl styrene) containing 44% of grafted polydiethylaminomethyl styrene which surrounded the polypropylene nucleus in the form of a shell of substantially even thickness was converted to its hydrochloride form, dried and charged into an apparatus consisting of a glass cylinder, 10 cm. in diameter, 20 cm. long, fitted at the top with a flange and three necked lid and provided at the bottom with a support comprised of a coarse (No. 1 frit) 10 cm. sintered glass disc to which a tap was attached. The particles in the reactor were fluidized with oxygen free nitrogen saturated with acrylic acid vapour at 20° C. The fluidizing medium was prepared by bubbling nitrogen through acrylic acid held in thermostatted bubblers and then passing the vapour mixture through a chemically inert thermostatted liquid trap. The temperature of the contents of the reactor was maintained several degrees above the dew point of the fluidizing medium. Irradiation of the fluidized contents of the reactor was carried out by surrounding the reactor with eight sources of cobalt-60 of 250 curies each delivering a nominal dose of $1.7 \times 10^5$ rads per hour and irradiation was continued until a total dose of 10 megarads had been delivered. At the completion of the irradiation the particles in the reactor were extracted with methanol, dried and weighed. The weight of the recovered product was 111 g. and the increase in weight was attributed to polyacrylic acid grafted to the particles the presence of which in the graft copolymer was confirmed by infra-red spectroscopy. Microscopic examination of the stained particles disclosed the presence of two separate discrete shells one of which contained anion exchange reactive groups and the other contained cation exchange reactive groups. There was thus obtained a graft copolymer suitable for use as an ion exchange resin which contained both anionic and cationic ion exchange groups on the one particle.

EXAMPLE 3

Example 1 was repeated but the poly(ethylene-g-acrylic acid) particles of that example were replaced by poly (ethylene-g-acrylic acid) particles containing 6% of grafted polyacrylic acid in which the polyethylene nucleus contained 16.6% $TiO_2$ and had been cross-linked with divinylbenzene prior to being reacted with acrylic acid in the presence of methanol to form a shell of acrylic acid of substantially even thickness surrounding the nucleus. Results similar to those of Example 1 were obtained.

EXAMPLE 4

A mixture of polyisopropylstyrene and polytetrafluoroethylene was compounded on a two roll mill so that a crepe was formed. The product, containing 35% w./w. of polytetrafluoroethylene, was ground to a powder which had an average size of 900µ and converted to spherical particles by a method described in Belgian Pat. 676,722. The spherical particles so obtained, on examination by a microscopic and staining technique, were shown to have areas on their surface of exposed polytetrafluoroethylene in a continuum of polyisopropylstyrene. 100 g. of these particles were placed in a reactor as described in Example 2 and grafted with acrylic acid under the conditions described in Example 2 except that the total dose delivered was reduced to 1.5 megarads. The weight of the recovered product was 105 g. and the increase in weight was attributed to polyacrylic acid the presence of which in the graft copolymer was confirmed by infra-red spectroscopy. Examination of the stained particles showed that the exposed areas of polytetrafluoroethylene had grafted preferentially and that the surface comprised of polyisopropylstyrene was largely unaffected. 100 g. of the particles so obtained were dispersed in a 10% w./w. solution of cumene hydroperoxide in water and the stirred dispersion was maintained at 45° C. for 5 hours. The resultant particles were separated by filtration, washed with methanol and dried under vacuum at room temperature. The particles were then dispersed in a 20% w./w. aqueous solution of N-vinylpyrrolidine HCl salt in a vessel purged with nitrogen and the stirred contents were heated firstly for 2 hours at 70° C. and then for a further five hours at 90° C. The resultant particles were separated by filtration, washed firstly with dilute HCl then with methanol and dried. 109 g. of product was obtained. Microscopic examination of the stained particles showed that grafting had occurred on the exposed areas of the nucleus consisting of polyisopropylstyrene. There was thus obtained a graft copolymer suitable for use as an ion exchange resin which contained both anionic and cationic ion exchange groups on the one particle.

EXAMPLE 5

This example demonstrates that copolymers having on the one particle groups having a base function and groups having an acid function may be used as an ion exchange medium and may be regenerated after use by means of a heat treatment. 80 g. of the copolymer prepared in Example 2 was equilibrated for 2 days at room temperature with an aqueous solution having a pH of 5.8 and containing 1100 p.p.m. NaCl. The particles of the so treated copolymer were separated by filtration, added to 90 ml. of saline solution containing 1100 p.p.m. NaCl and the mixture was heated at 80° C. for 10 minutes. The mixture was then filtered hot and the filtrate was shown to contain 2000 p.p.m. NaCl.

EXAMPLE 6

100 g. of spherical poly(ethylene - g - acrylic acid) particles containing 16.1% w./w. grafted polyacrylic acid and in which the polyacrylic acid surrounded the polyethylene nucleus in the form of a shell of substantially even thickness was reacted with sufficient sodium hydroxide in aqueous solution to convert the particles to the sodium salt form. The treated particles were washed with water and then immersed in a 20% w./w. aqueous solution of vinyl sulphonic acid sodium salt contained in a glass reaction vessel fitted with a stirrer. The reaction vessel was purged with nitrogen. Whilst being stirred gently at room temperature the contents of the reaction vessel were irradiated from a cobalt-60 source at a dose rate of 0.17 megarad per hour until a total dose of 0.2 megarad had been delivered. The irradiated beads were then separated by filtration, washed with water until free of monomer and homopolymer, dried and weighed. The weight of polyvinyl sulphonic acid sodium salt grafted on to the first shell was 1.6 g. There was thus obtained a graft copolymer suitable for use as an ion exchange resin which contained on the one particle both a strongly acidic group and a weakly acidic group.

EXAMPLE 7

The product of Example 6 was used as an ion exchange resin in a mixed bed in the purification of water contaminated with humic acids. After four weeks use the resin was still capable of regeneration showing that the humic acid precipitated on the resin did not impair the ion exchange properties. Furthermore, the humic acid could be removed from the resin by backwashing with hot water.

EXAMPLE 8

Spherical particles of poly(ethylene-g-aminostyrene) containing 20% w./w. of grafted amino styrene and in which the polyaminostyrene surrounded the polyethylene nucleus in the form of a shell of substantially even thickness were sieved. 200 g. of that portion which passed a 36 mesh and were retained on a 50 mesh British Standard Sieve was reacted at 80° C. for one hour with an aqueous solution of 40 g. of brominated ethylene diamine tetraacetic acid in 500 ml. of water in the presence of an excess of sodium hydroxide. The resultant product was separated by filtration, washed with water and dried to give 249 g. of product representing a 50 molar percent substitution of the amino styrene in the formation of poly{{ethylene - g - poly{p-[α((N-carboxymethyl-N'N'bis (carboxy methyl)ethylenediamino)glycino]stryene}}}. The particles so formed were immersed in a 20% w./w. aqueous solution of vinyl sulphonic acid sodium salt contained in a glass reaction vessel fitted with a stirrer. The reaction vessel was purged with nitrogen. Whilst being stirred gently at room temperature the contents of the reaction vessel were irradiated from a cobalt-60 source at a dose rate of 0.3 megarad per hour until a total dose of 1.0 megarad had been delivered. The irradiated beads were then separated by filtration, washed with water until free of monomer and homopolymer, dried and weighed to give 254 g. of product. The weight increase was attributed to the grafting of vinyl sulphonic acid sodium salt as an outer polymeric shell on to the particles. After the particles were complexed with ferric ions, microscopic examination of sectioned particles showed that they were composed of a clear nucleus surrounded by two shells one being straw yellow in colour and the other being a brownish yellow. These copolymers were suitable for the purification of water, being capable of removing both metallic ions and humic acid.

I claim:
1. A graft copolymeric resin in particulate form comprising a discrete polymeric nucleus selected from the group consisting of low and high density polyethylenes, polypropylene, polybutene, poly-4-methylpentene-1, polytetrafluoroethylene, poly(monochlorotrifluoroethylene), polyvinylchloride, polyvinylfluoride, polyvinylidene chloride, polystyrene, polyisopropylstyrene, polyacrylates, polymethacrylates and polyacrylamides which has grafted on to it and surrounding it a first substantially non-cross-linked graft-copolymeric layer which is graft polymerized from a monomer selected from the group consisting of alkenes and alkylidenes carrying an ion exxchange reactive group selected from the group consisting of sulphonic, phosphonic, phosphinic, thiophosphinic, arsonic, carboxy, primary, secondary or tertiary amine, quarternary ammonium, phosphonium, tertiary sulphonium and metal chelating groups, and furthermore a second substantially non-cross-linked graft-copolymeric layer grafted on to and surrounding said first layer, said second layer being graft polymerized from a monomer selected from the group consisting of alkenes and alkylidenes carrying an ion exchange reactive group selected from the group consisting of sulphonic, phosphonic, phosphinic, thiophosphinic, arsonic, carboxy, primary, secondary or tertiary amine, quarternary ammonium, phosphonium, tertiary sulphonium and metal chelating groups the said ion exchange reactive group of the said second layer being of sign opposite to that of the ion exchange reactive group of the said first layer, said nucleus being free from ion exchange sites and non-reactive in ion exchange reactions and said copolymeric layers in total comprising between 0.1 ad 55% by weight of the copolymer particle and acting as an ion exchange medium.

2. Shaped graft copolymer resins according to claim 1 comprising a polymeric nucleous selected from the group consisting of low and high density polyethylenes, polypropylene, polybutene, poly - 4 - methylpentene-1, polytetrafluoroethylene, poly(monochlorotrifluoroethylene, polyvinylchloride, polyvinylfluoride, polyvinylidene chloride, polystyrene, polyisopropylstyrene, polyacrylates, polymethacrylates and polyacrylamides having grafted on to and around it a first polymeric shell which is graft-copolymerized from a monomer selected from the group consisting of alkenes and alkylidenes carrying an ion exchange reactive group selected from the group consisting of sulphonic, phosphonic, phosphinic, thiophosphinic, arsonic, carboxy, primary, secondary or tertiary amine, quaternary amonium, phosphonium, tertiary sulphonium and metal chelating groups and furthermore having grafted onto and around said first shell a second outer polymeric shell which is graft-copolymerized from a monomer selected from the group consisting of alkenes and alkylidenes carrying an ion exchange reactive group selected from the group consisting of sulphonic, phosphonic, phosphinic, thiophosphinic, arsonic, carboxy, primary, secondary or tertiary amine, quaternary ammonium, phosphonium, tertiary sulphonium and metal chelating groups the said ion exchange reactive group of the said second shell being of sign opposite to that of the ion exchange reactive group of the said first shell, characterized in that substantially the whole of the nucleus is free from the co-mer units forming the shells and is insoluble and substantially non-swelling in the monomer or medium used in the grafting processes of the shells and characterized further in that the polymeric shells are substantially non-cross-linked, the first shell is covalently bonded to the polymeric nucleus and surrounds it substantially symmetrically, the second shell is covalently bonded to the said first shell and surrounds it substantially symmetrically and wherein said shells in total comprise between 0.1 and 55% by weight of the copolymer and act as an ion exchange medium.

3. Shaped graft copolymer resin according to claim 2 wherein the shell portion comprises between 2% and 35% by weight of the copolymer.

4. Shaped graft copolymer resin according to claim 2 wherein the nucleus is cross-linked.

5. Graft copolymeric resin particles according to claim 2 in the shape of spherical or quasispherical beads having a diameter from 0.1 to 2 mm., a ratio of total radius R to radius of the inert polymeric nucleus $r$ between 0.9996 and 0.765 and a highly uniform thickness $(R-r)$ of the combined graft copolymeric shells.

6. Graft copolymeric resin particles according to claim 2 wherein the polymeric nucleus is compounded with a heavier inert filler.

7. A process of manufacturing dual shell graft copolymeric resins in particulate form which process comprises graft polymerizing on to and around an inert polymeric nucleus selected from the group consisting of low and high density polyethylenes, polypropylene, polybutene, poly-4-methylpentene-1, polytetrafluoroethylene, poly(monochlorotrifluoroethylene), polyvinylchloride, polyvinylfluoride, polyvinylidene chloride, polystyrene, polyisopropylstyrene, polyacrylates, polymethacrylates and polyacrylamides, a first separate and discrete shell of substantially even thickness of a first copolymer formed from a monomer selected from the group consisting of alkenes and alkylidenes carrying an ion exchange reactive group selected from the group consisting of sulphonic, phosphonic, phosphinic, thiophosphinic, arsonic, carboxy, primary secondary or tertiary amine, quaternary ammonium, phosphonium, tertiary sulphonium and metal chelating groups, converting said first copolymer to its salt form, reacting the resultant product with a further copolymerizable co-mer selected from the group consisting of alkenes and alkylidenes carrying an ion exchange reactive group selected from the group consisting of sulphonic, phosphonic, phosphinic, thiophosphinic, arsonic, carboxy, primary, secondary or tertiary amine, quaternary ammonium, phosphonium, tertiary sulphonium and metal chelating groups but being of sign opposite to that of the ion exchange reactive group of the said first copolymer, so as to graft on to and around the first shell a second copolymer thereby forming a second, separate and discrete outer shell of substantially even thickness.

References Cited
UNITED STATES PATENTS

| | | | |
|---|---|---|---|
| 2,956,899 | 10/1960 | Claine | 117—47 |
| 2,999,056 | 9/1961 | Tanner | 204—154 |
| 3,252,880 | 5/1966 | Magat et al. | 204—154 |
| 3,252,921 | 5/1966 | Hansen et al. | 260—2.2 |
| 3,310,605 | 3/1967 | Marans et al. | 260—877 |
| 3,489,699 | 1/1970 | Battaerd et al. | 260—2.1 |

WILLIAM H. SHORT, Primary Examiner

M. GOLDSTEIN, Assistant Examiner

U.S. Cl. X.R.

161—174; 204—159.15, 159.17; 252—426; 260—2.2, 2.5, 827, 857, 878, 879, 884, 885, 886